May 28, 1940.   A. H. J. DE L. SAINT GENIES   2,202,354
APPARATUS FOR PHOTOGRAPHY IN RELIEF WITH OR WITHOUT COLOR
Filed Nov. 4, 1938
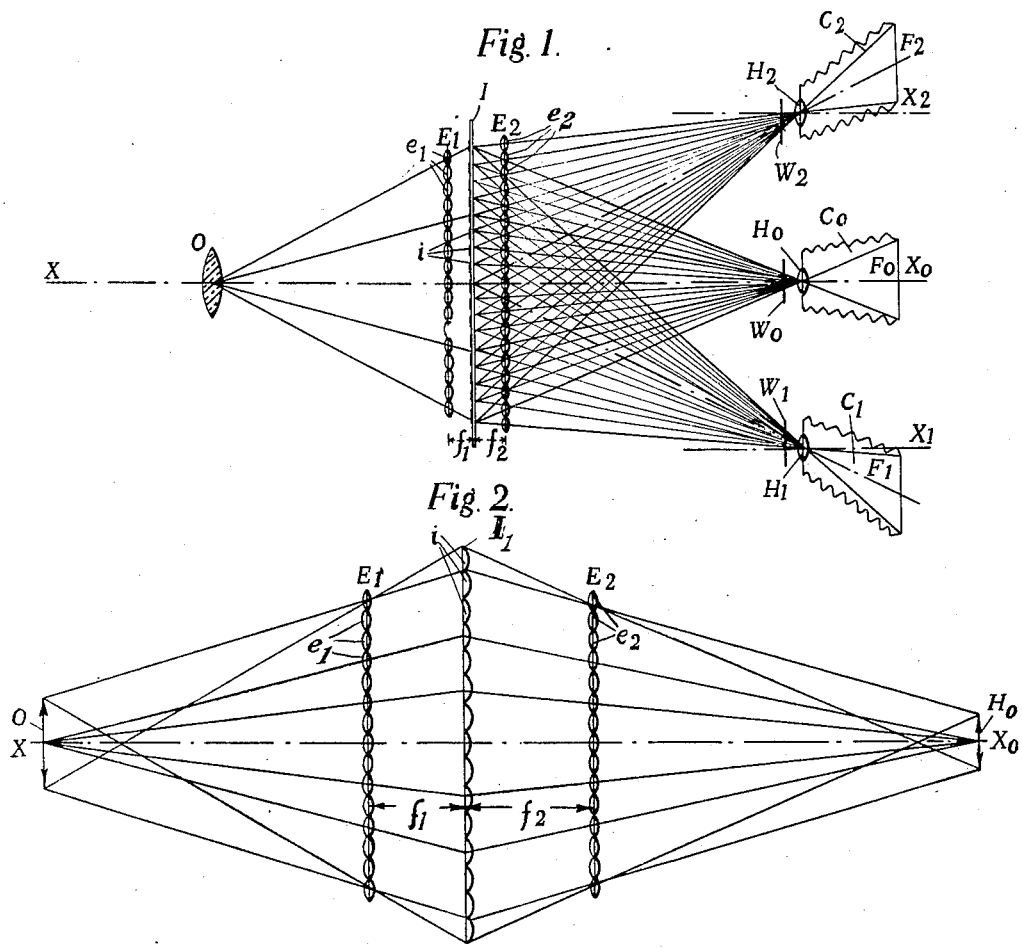
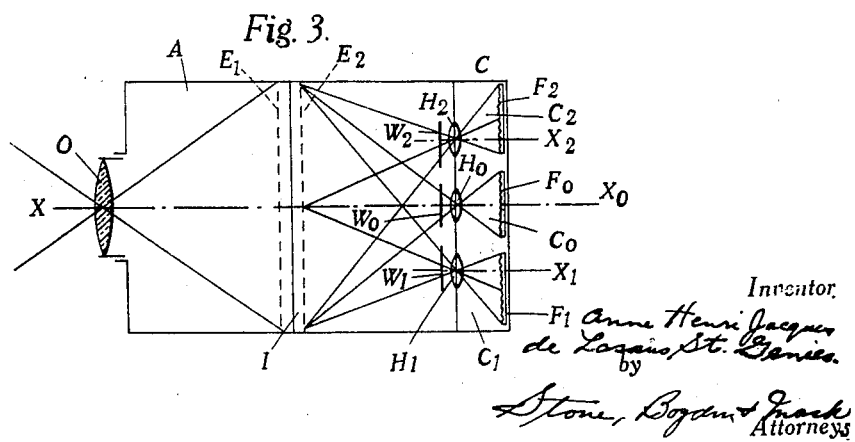

Patented May 28, 1940

2,202,354

UNITED STATES PATENT OFFICE

2,202,354

APPARATUS FOR PHOTOGRAPHY IN RELIEF WITH OR WITHOUT COLOR

Anne Henri Jacques de Lassus Saint Genies, Versailles, France

Application November 4, 1938, Serial No. 238,868
In France April 14, 1934

4 Claims. (Cl. 95—2)

This application is a continuation in part of my co-pending application Serial No. 15,644 filed April 10, 1935, and now Patent No. 2,139,855.

The main application discloses apparatus for taking pictures in relief on a lenticular film, of the type in which use is made of a primary objective of large diameter and of great focal length which projects onto a complex translucent lenticular screen a three-dimensional image, an image of which is in turn projected onto a lenticular film by means of a secondary objective of small diameter and small focal length. By the term "complex translucent lenticular screen" is meant an arrangement comprising at least two lenticular networks each composed of a large number of small lenses in juxtaposed relation, and an image receiving surface such as a ground glass plate between the networks. Such arrangements are disclosed in my Patent No. 2,131,974.

The apparatus normally comprises two chambers, the first being provided with the primary objective and containing the complex translucent lenticular screen and the second chamber being provided with the small secondary objective and being adapted to receive the film on which the picture is to be recorded.

The present invention is based on the following considerations:

Given that the functions peculiar to each of the two chambers of the view-taking apparatus are neither changed nor altered if, under certain conditions, the principal optical axes, instead of coinciding, are only parallel at a certain spacing, the optical axis of the second chamber need not necessarily coincide with that of the first. Therefore, several positions can be found for the second chamber, or even several chambers can be substituted for it. The arrangement of these secondary chambers must then comply with the following conditions:

Their optical axes must be parallel to the optical axis of the primary chamber, that is, the principal optical axes of their objectives must be parallel to that of the primary chamber.

The spacings of these axes from one another must be defined in one direction only when the face of the complex lenticular screen which faces the second chamber or chambers carries cylindrical gofferings, and must be defined in all directions when this goffering is spherical.

Finally, one should preferably avoid the use in the complex lenticular screen of a complex lens of the Fresnel type (which may sometimes be used instead of the ground glass plate) capable of hindering the uniform distribution of the luminous flux, unless the secondary objectives are fixed on a line which intersects at a right angle the principal axis of the apparatus and is parallel to the cylindrical lenticulations of the networks of the screen.

When these conditions are satisfied, there is obtained, according to the present invention, on the emulsion of the film of each secondary chamber, a record of an image similar to that which is obtained with two coaxial chambers.

Each of the secondary chambers may be provided with an individual filter so as to record only one monochrome, and their number may correspond to the polychrome process adopted.

With such an arrangement, the film employed may be goffered cylindrically with vertical lining, as if it were only a question of recording stereoscopic and moving pictures, since the separate monochromes are simultaneously recorded on the film, but on absolutely separate portions of this film for each monochrome.

It will easily be understood that no parallax will thus be introduced from one monochrome to the other.

At the expense of a certain parallax (except for the objectives of the second chambers, the optical axes of which are in the same plane parallel to the lining of the goffering) and up to a tolerable limit, the $n$ small images of the same subject could be recorded, juxtaposed on the same portion of film equal to the maximum size which a single guide can exhibit, by the aid of $n$ juxtaposed objectives in a single optical system especially adapted for this purpose. Under such conditions, the parallel axes of these $n$ objectives would be distributed symmetrically, preferably around the principal axis of the objective of the first chamber, and the special screen of which could again comprise a lens of the Fresnel type. Each of the $n$ objectives will be provided with a selective filter, as is obvious.

The films recorded with $n$ juxtaposed objectives may be used for making copies of the same or different size, according to the dimension of the films employed in taking and in projecting, and will be projected by means of similar complex optical systems, with the residue of parallax tolerated in taking, or without any parallax if the precautions desired have been observed when taking, as explained above.

The invention will be described with reference to the accompanying drawing in which:

Fig. 1 illustrates the principle on which the present invention is based.

Fig. 2 shows one form of the complex lenticular screen.

Fig. 3 shows a camera constructed in accordance with the present invention.

According to the present invention, in apparatus of the type hereinbefore set forth, a plurality of secondary objectives are provided, arranged with their principal optical axes parallel to one another and to that of the primary objective, whereby the subject photographed may be recorded on a plurality of lenticular films. A colour filter may be arranged in front of each objective so that a separate monochrome image is obtained on each film or on each picture space of every group of successive picture spaces of the lenticular film.

Referring to Fig. 1 the primary objective of large diameter and long focal length is represented by O. The complex transparent lenticular screen, which is arranged substantially in the focal plane of the objective O, comprises a first network $E_1$, a ground glass plate I and a second lenticular network $E_2$. The position of the ground glass plate I is such that it lies in a plane conjugate with the objective O with respect to the elements $e_1$ of the network $E_1$ and thus the elements $e_1$ form on the ground glass plate I a large number of small, separate, and non-overlapping images $i$ of the exit pupil of the objective O. The walls of the first chamber normally provided are not shown in Fig. 1.

The apparatus includes three secondary chambers $C_0$, $C_1$ and $C_2$ provided with the secondary objectives $H_0$, $H_1$ and $H_2$ respectively, these objectives being of small diameter and of short focal length. The secondary chambers are adapted to receive the films $F_0$, $F_1$ and $F_2$ on each of which an image of the subject photographed is to be recorded. It will be seen that the optical centres of the objectives $H_0$, $H_1$ and $H_2$ lie in a plane normal to the principal optical axis $X$ of the apparatus and their principal optical axes $X_0$, $X_1$ and $X_2$ respectively are parallel to one another and to the said principal optical axis of the apparatus. $W_0$, $W_1$ and $W_2$ are individual color filters arranged in front of the secondary objectives.

The secondary network $E_2$ of the complex lenticular screen is so arranged that the plane containing the ground glass plate I is conjugate with the plane containing the secondary objectives with respect to the elements $e_2$. The elements $e_2$ correspond one by one with the elements $e_1$ and their optical centres are aligned with the centres of the images $i$ and the optical centre of the secondary objective $H_0$. It will be seen from the drawing that they are similarly aligned with the said small images and the objective $H_1$ and also with the objective $H_2$; more particularly stated, the spacing of the secondary objectives is such that a ray of light issuing from the centre of the extreme uppermost image $i$ and passing through the optical centre of the element $e_2$ next to the extreme uppermost element will pass through the optical centre of the objective $H_0$ whilst a ray issuing from the same point and passing through the optical centre of the extreme uppermost element $e_2$ will pass through the optical centre of $H_2$ and a ray issuing from the same point and passing through the third element $e_2$ from the top of the network will pass through the optical centre of $H_1$. The elements $e_2$ project the small images $i$ exactly onto the entrance pupils of the three objects $H_0$, $H_1$ and $H_2$. It can be also shown that the images formed on the emulsions of the films are identical if the pitches of the lenticulations of the said films and their thicknesses are proportional to the pitch of the network $E_2$ and to the distance between this network and the plane I.

Fig. 2 shows a modified form of the complex lenticular screen shown in Fig. 1 and also shows more clearly the formation of the small images of the exit pupil of the objective O and the alignment of the elements $e_2$ with the said small images and the central secondary objective $H_0$. In the form of lenticular screen shown in this figure the simple ground glass sheet is replaced by a network $I_1$ comprising plano-convex lenses, the plane surfaces of which are frosted to form an image receiving surface. This form of translucent lenticular screen is disclosed in my co-pending application Serial No. 15,644. Obviously the network $I_1$ may be made light dispersive in any other way than by frosting, for example, by the use of opal glass. The optical centres of the lenses $e_1$ are aligned with the optical centres of the lenses of the network $I_1$ and with the optical centre of O whilst the optical centres of lenses $e_2$ are aligned with the optical centres of the lenses of $I_1$ and with the optical centre of $H_0$.

In Fig. 3 the camera comprises a first chamber A provided with the primary objective O and containing the complex lenticular screen $E_1$, I, $E_2$, and a second chamber C which may be regarded as subdivided into three compartments $C_0$, $C_1$ and $C_2$ adapted to receive the films $F_0$, $F_1$ and $F_2$ on which the picture is to be recorded. The construction of the images takes place as described with reference to Fig. 1.

By means of the apparatus according to the present invention, a different monochrome may be recorded on the several films, which are superimposed on projection to give a picture in both color and relief.

I claim:

1. Apparatus for taking pictures in relief on lenticular films comprising a primary objective of large diameter and of great focal length, a plurality of secondary objectives of small diameter and of short focal length each associated with a lenticular film, said secondary objectives being arranged with their optical centres in a common plane orthogonal to the principal optical axis of the apparatus and with their principal optical axes parallel to one another, and a complex translucent lenticular screen arranged between said primary objective and said secondary objectives, said lenticular screen comprising a translucent image collecting member near the focal plane of said primary objective, a first lenticular network between said primary objective and said translucent image collecting member, said first lenticular network being arranged so that the image collecting member lies in a plane conjugate with that of the primary objective with respect to said first lenticular network whereby said first lenticular network forms on said translucent image collecting member a large number of small images of the exit pupil of said primary objective, and a second lenticular network between said translucent image collecting member and said plurality of secondary objectives, said second lenticular network and said secondary objectives being arranged so that the said translucent image collecting member lies in a plane conjugate with the plane of said secondary objectives with respect to said second lenticular network, the centres of the optical elements of said second lenticular network being aligned with centres of the small images formed on said translucent image collecting member and with the centre of each secondary objective, whereby said second lenticular network forms images of said small images in the entrance pupil of each of said secondary objectives.

2. Apparatus for taking pictures in relief on lenticular films comprising a primary objective of large diameter and of great focal length, a plurality of secondary objectives of small diameter and of short focal length each associated with a lenticular film, said secondary objectives being arranged with their optical centres in a common plane orthogonal to the principal optical axis of the apparatus and with their principal optical axes parallel to one another, and a complex translucent lenticular screen arranged between said primary objective and said secondary objectives, said lenticular screen comprising an intermediate network of plano-convex lenses, the plane surfaces of which are frosted to form an image receiving surface, said intermediate network being arranged near the focal plane of said primary objective, a first lenticular network between said primary objective and said intermediate network, the optical elements of said first lenticular network being aligned with the optical centres of lenses of said intermediate network and with the optical centre of said primary objective, said first lenticular network being arranged so that the intermediate network lies in a plane conjugate with that of the primary objective with respect to said first lenticular network whereby said first lenticular network forms on the image collecting surface of said intermediate network a large number of small images of the exit pupil of said primary objective, and a second lenticular network between said intermediate network and said plurality of secondary objectives, said second lenticular network and said secondary objectives being arranged so that the said intermediate network lies in a plane conjugate with the plane of said secondary objectives with respect to said second lenticular network, the centres of the optical elements of said second lenticular network being aligned with centres of the small images formed on said intermediate network and with the optical centre of each secondary objective, whereby said second lenticular network forms images of said small images in the entrance pupil of each of said secondary objectives.

3. Apparatus for taking color separation records on lenticular films for use in photography in color and relief, comprising a primary objective of large diameter and of great focal length, a plurality of secondary objectives of small diameter and of short focal length each associated with a lenticular film, said secondary objectives being arranged with their optical centres in a common plane orthogonal to the principal optical axis of the apparatus and with their principal optical axes parallel to one another, a color filter associated with each secondary objective, one for each color separation record to be obtained, and a complex translucent lenticular screen arranged between said primary objective and said secondary objectives, said lenticular screen comprising a translucent image collecting member near the focal plane of said primary objective, a first lenticular network between said primary objective and said translucent image collecting member, said first lenticular network being arranged so that the image collecting member lies in a plane conjugate with that of the primary objective with respect to said first lenticular network whereby said first lenticular network forms on said translucent image collecting member a large number of small images of the exit pupil of said primary objective, and a second lenticular network between said translucent image collecting member and said plurality of secondary objectives, said second lenticular network and said secondary objectives being arranged so that the said translucent image collecting member lies in a plane conjugate with the plane of said secondary objectives with respect to said second lenticular network, the centres of the optical elements of said second lenticular network being aligned with centres of the small images formed on said translucent image collecting member and with the centre of each secondary objective, whereby said second lenticular network forms images of said small images in the entrance pupil of each of said secondary objectives.

4. Apparatus for taking color separation records on lenticular films for use in photography in color and relief, comprising a primary objective of large diameter and of great focal length, a plurality of secondary objectives of small diameter and of short focal length each associated with a lenticular film, said secondary objectives being arranged with their optical centres in a common plane orthogonal to the principal optical axis of the apparatus and with their principal optical axes parallel to one another, a color filter associated with each secondary objective, one for each color separation record to be obtained, and a complex translucent lenticular screen arranged between said primary objective and said secondary objectives, said lenticular screen comprising an intermediate network of plano-convex lenses, the plane surfaces of which are frosted to form an image receiving surface, said intermediate network being arranged near the focal plane of said primary objective, a first lenticular network between said primary objective and said intermediate network, the optical elements of said first lenticular network being aligned with the optical centres of lenses of said intermediate network and with the optical centre of said primary objective, said first lenticular network being arranged so that the intermediate network lies in a plane conjugate with that of the primary objective with respect to said first lenticular network whereby said first lenticular network forms on the image collecting surface of said intermediate network a large number of small images of the exit pupil of said primary objective, and a second lenticular network between said intermediate network and said plurality of secondary objectives, said second lenticular network and said secondary objectives being arranged so that the said intermediate network lies in a plane conjugate with the plane of said secondary objectives with respect to said second lenticular network, the centres of the optical elements of said second lenticular network being aligned with centres of the small images formed on said intermediate network and with the optical centre of each secondary objective, whereby said second lenticular network forms images of said small images in the entrance pupil of each of said secondary objectives.

ANNE HENRI JACQUES DE LASSUS
ST. GENIES.